T. A. Long,
Soda Fountain.
No. 63,537.   Patented Apr. 2, 1867.
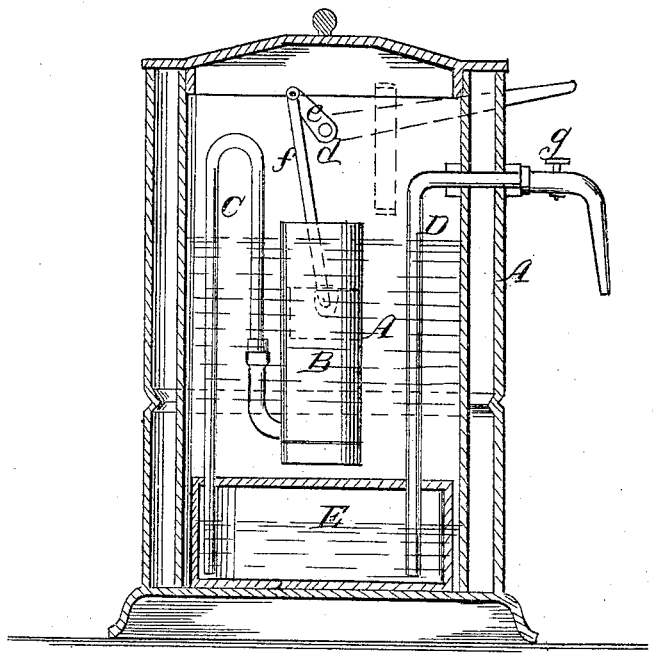
Witnesses:
Theo Tusche
Wm Trevin
Inventor:
T. A. Long
Per Munn & Co
Attorneys

United States Patent Office.

T. A. LONG, OF MEADVILLE, PENNSYLVANIA.

*Letters Patent No. 63,537, dated April 2, 1867.*

IMPROVED SODA-FOUNTAIN.

*The Schedule referred to in these Letters Patent and making part of the same.*

TO ALL WHOM IT MAY CONCERN:

Be it known that I, T. A. LONG, of Meadville, in the county of Crawford, and State of Pennsylvania, have invented a new and useful Improvement in Soda-Fountains; and I do hereby declare that the following is a full, clear, and exact description thereof, which will enable those skilled in the art to make and use the same, reference being had to the accompanying drawings, forming part of this specification.

This invention relates to the manner in which the materials of which soda water is made and cooled are mixed, and also to the arrangement whereby the apparatus is condensed into a small space and rendered portable, and the invention consists in placing the materials (water, ice, and soda,) in a suitable vessel, and forcing the same into an air-chamber, where the soda is forced out and discharged by the compressed air in the chamber, and also in making the apparatus in a portable form, as will be hereinafter described.

The drawing represents a central vertical section of my apparatus.

A represents the outer case, which is constructed with double walls as seen in the drawing; B represents the force-pump; C is a pipe leading from the pump to the reservoir or air-chamber through which the water is forced; D is the discharge pipe; E is the air-chamber. The water, and ice and soda, are placed in the case A in suitable quantities and proportions, and the water which is impregnated with the soda is drawn into the pump and forced into the air-chamber E near the bottom of the chamber. As the chamber fills with the liquid the contained air becomes compressed and forms a spring, which by its pressure on the liquid forces it up through the pipe D and discharges it into the glass. The fulcrum or pivot to which the pump handle is attached passes through the side of the case A, as is seen at $d$ in the drawing. Its inner end is turned at right angles with the pivot, forming an arm, to the end of which the piston-rod of the pump is attached. This arm is seen at $e$, and $f$ denotes the piston-rod. The handle of the pump is attached rigidly to the outer end of the pivot or outside of the case; $b$ is the handle. To form the effervescing soda water, the proper acid is placed in the glass into which the water from chamber E is discharged; $g$ is the cock by which the flow of the liquid is controlled. In consequence of the elasticity of the air in the chamber E, a few strokes of the pump are sufficient to charge the chamber, so that a large number of glasses of soda water may be discharged in a constant, steady stream without handling the pump, thus making this portable apparatus equal (or nearly so) to the immovable and expensive soda-fountain now in use. Another important advantage is, the ice is all used in the water, and consequently none is wasted in cooling outside pipes.

What I claim as new, and desire to secure by Letters Patent, is—

The arrangement of the pump B, the chamber E, the pipes C and D, constructed substantially as described, in combination with the casing A for the purposes set forth.

T. A. LONG.

Witnesses:
WM. BEATTY,
J. D. DUNN.